J. T. FAGAN.
MACHINE FOR MANIPULATING GLASS RODS AND FORMING SPIDERS THEREWITH.
APPLICATION FILED JUNE 12, 1908.

1,128,120.  
Patented Feb. 9, 1915.  
6 SHEETS—SHEET 5.

Witnesses  
E. B. Gilchrist  
H. P. Sullivan

Inventor  
John T. Fagan  
by  
Attorneys

UNITED STATES PATENT OFFICE.

JOHN T. FAGAN, OF CLEVELAND, OHIO, ASSIGNOR, BY MESNE ASSIGNMENTS, TO GENERAL ELECTRIC COMPANY, A CORPORATION OF NEW YORK.

MACHINE FOR MANIPULATING GLASS RODS AND FORMING SPIDERS THEREWITH.

1,128,120.  Specification of Letters Patent.  Patented Feb. 9, 1915.

Application filed June 12, 1908.  Serial No. 438,046.

*To all whom it may concern:*

Be it known that I, JOHN T. FAGAN, a citizen of the United States, residing at Cleveland, in the county of Cuyahoga and State of Ohio, have invented a certain new and useful Improvement in Machines for Manipulating Glass Rods and Forming Spiders Therewith, of which the following is a full, clear, and exact description.

The object of the present invention is to provide a machine for the manipulation of rods of glass or other similar vitreous substances to the end of producing fused zones thereon, into which zones are inserted anchor wires for the filaments of tantalum lamps.

The finished article may be aptly called a spider, since its character as a skeleton frame upon which the filaments are hung render such a term sufficiently descriptive of the general character of the article. These spiders have heretofore been made by hand, and their production has been subject to those obvious disabilities which attend the manufacture by hand of articles of this nature. With the individual factor of the operator entering into the equation, the production of fused zones, ordinarily in the form of buttons, has not always been properly done, and it frequently has happened that the anchor wires inserted into the buttons are not properly spaced and touch at their inner ends, so that a shunting of the current results. It will be apparent also that hand production is comparatively slow.

The above and many other advantages are clearly pointed out in the following specification, reference being had to the accompanying drawings, in which—

The machine comprises a supporting frame work of any suitable construction, such as that shown, in which four standards A both carry and are connected by two supporting cross-heads A', A², the upper one A' of which carries the reciprocating chuck B which holds the glass rods during the formation of the buttons thereon and the insertion of the anchor wires therein, the lower cross head A² supporting the reciprocating thrust rod against which the glass rods are pressed, and also supporting the wire feeding mechanism which will be more fully described below.

The machine receives its power in the present instance through the medium of a constantly driven pulley C which transmits its motion through the medium of a perpendicular shaft C' supported in the frame. Hung below the pulley and slidably mounted upon the shaft is a clutch member C² by which motion is transmitted from the pulley to the shaft. A yoke C³ under spring tension supports the clutch, the spring tending to lift the yoke so that the clutch will be thrown into engagement with the pulley.

Figure 1:
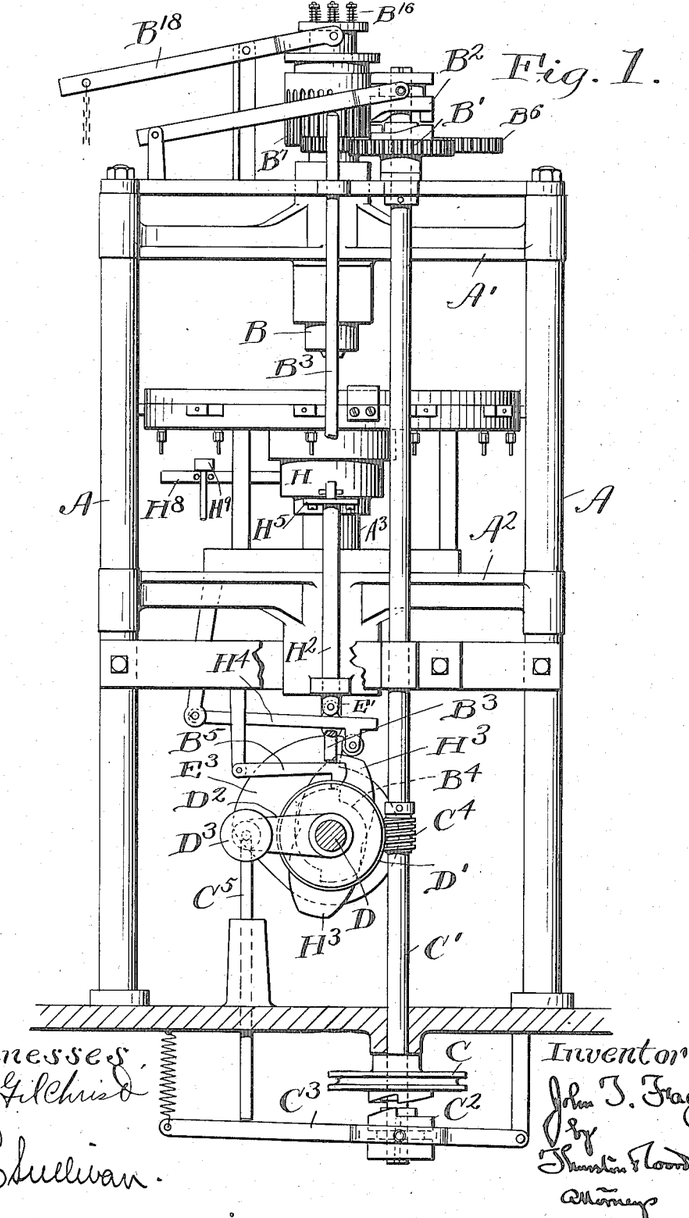
Figure 1 is a side elevation, certain parts being broken away and certain parts being omitted for the sake of clearness.
Figure 6:
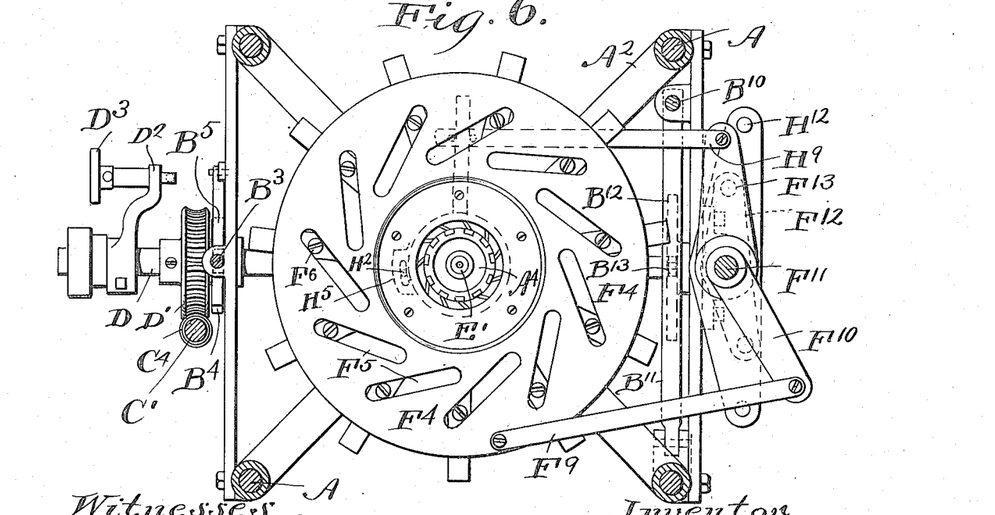
Fig. 6 is a plan with the reciprocating chuck and supporting structure removed.
Figure 7:
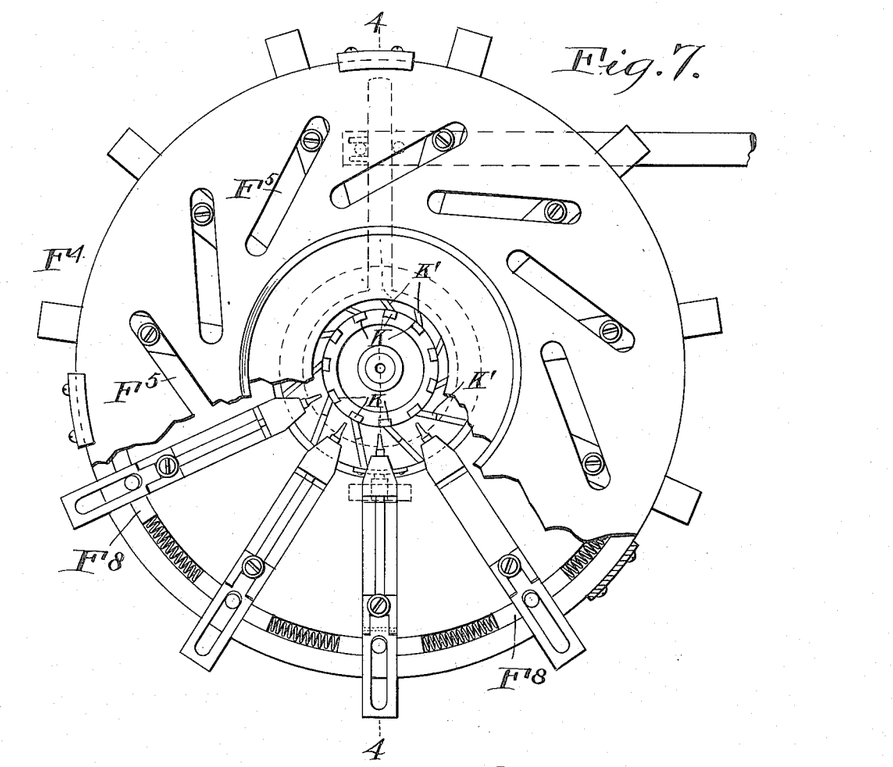
Fig. 7 is an enlarged plan showing the wire feeding devices and their operating mechanism, certain parts being broken away.
Figure 8:
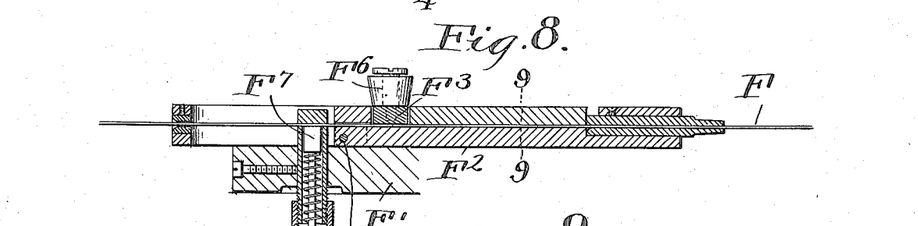
Fig. 8 is an enlarged longitudinal section of one of the wire feeding chuck bars.
Figure 9:
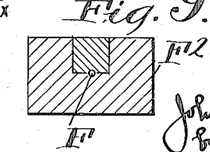
Fig. 9 is an enlarged cross section of Fig. 8 on the line 9—9.

A worm C⁴ on the shaft transmits motion to a horizontal shaft D through the medium of a worm gear D' in mesh therewith. An arm D² fixed to the horizontal shaft, as shown in Figs. 1 and 6, and having in its outer end a longitudinally reciprocatable pin D³, rotates in such a path that the end of the pin strikes a vertically reciprocatable rod C⁵ held in the frame of the machine. The lower end of this rod rests upon the yoke C³ which holds the clutch member C² in engagement with the before mentioned pulley C. Whenever the horizontal shaft D has completed one revolution, the pin D³ in the end of the projecting arm D² will strike the vertical rod C⁵ and throw the clutch member out of engagement with the pulley and the pulley will thereafter rotate idly.

At the upper end of the vertical shaft C' through which motion is transmitted to the mechanism, is a spur gear B' loosely rotatable thereon, above which is a clutch member B² slidably fixed to the shaft. This clutch member is lifted out of engagement with the spur gear by means of a yoke which is operated by a vertical rod B³ reciprocatably mounted in the frame and controlled as to its reciprocation by means of a cam B⁴ fixed to and rotatable with the before mentioned horizontal shaft D. For the purpose of better constructing this particular machine, I have interposed a pivoted dog B⁵ between the lower end of this vertical rod and the cam which controls its reciprocation, but this is not an essential construction, since in a machine of different proportions a rod could rest directly upon the cam by which it is reciprocated. When the cam B⁴ is in the proper position to permit the vertical rod to drop to its lowest point and the clutch member B² consequently to drop into engagement with the loosely mounted spur gear B', motion may then be transmitted from this gear through an idler B⁶ to a gear B⁷ fixed at the upper end of the vertically reciprocatable chuck sleeve B in which the glass rods are held during the formation of the spider. This chuck sleeve being somewhat heavy, a suitable counter-weight B⁸ is connected therewith for the purpose of approximately balancing the load,—this weight being preferably located on the outer end of the yoke lever B⁹ through which the reciprocation of the sleeve is controlled. This yoke lever receives its motion from a vertical rod B¹⁰ upon which it rests, the lower end of the rod resting upon a pivoted horizontal arm B¹¹, which, in turn, rests upon a cam disk B¹² fixed to the before mentioned rotatable horizontal shaft D. An anti-friction roller B¹³ is preferably secured to the under side of the horizontally pivoted arm for the purpose of facilitating the operation and to enable the eccentricities of the cam surface to be more readily followed. It is this cam B¹², rotating upon the shaft D which controls the formation of buttons upon the glass rod when it has been properly fused, as will appear below.

Figure 4:
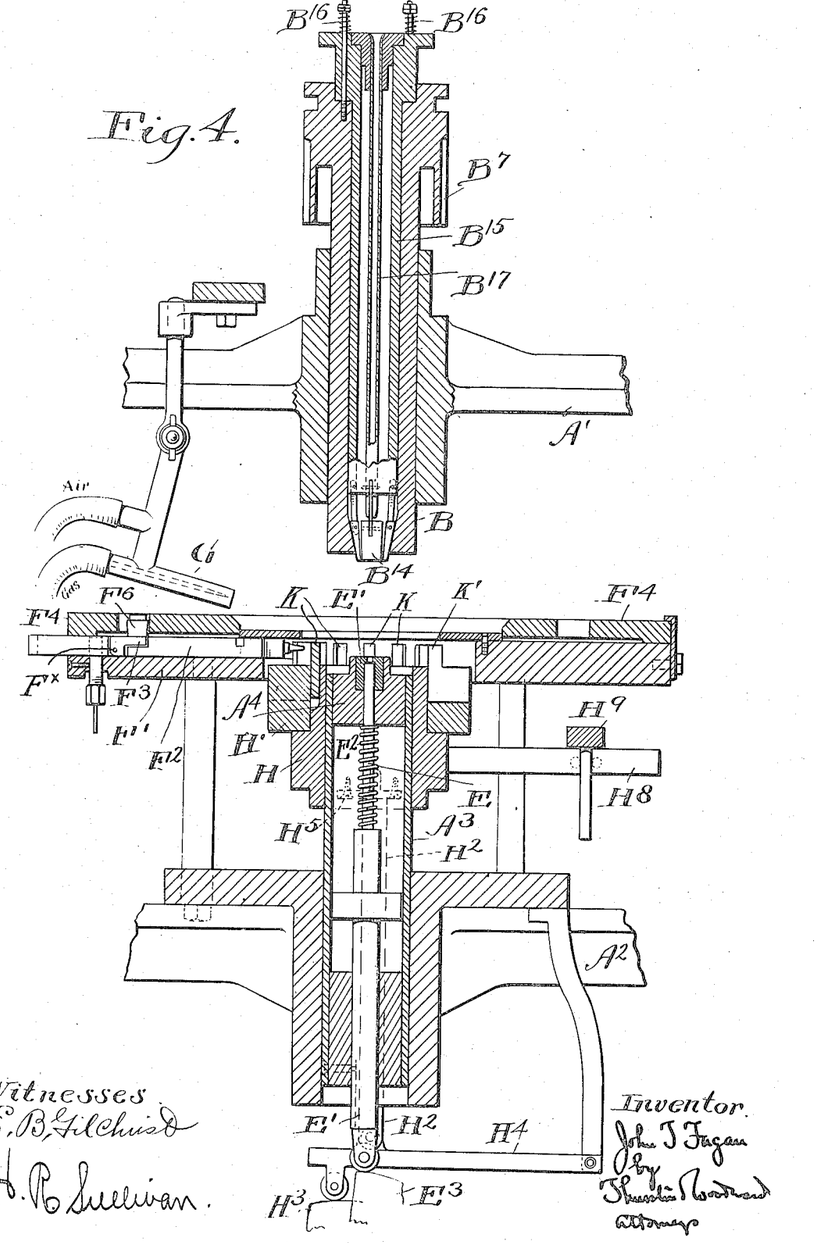
Fig. 4 is an enlarged sectional detail of the reciprocating chuck and the reciprocating thrust rod and mechanism therefor, the wire feeding apparatus and fusing burner being shown in elevation, the section following substantially the line 4—4 of Fig. 7.
Figure 5:
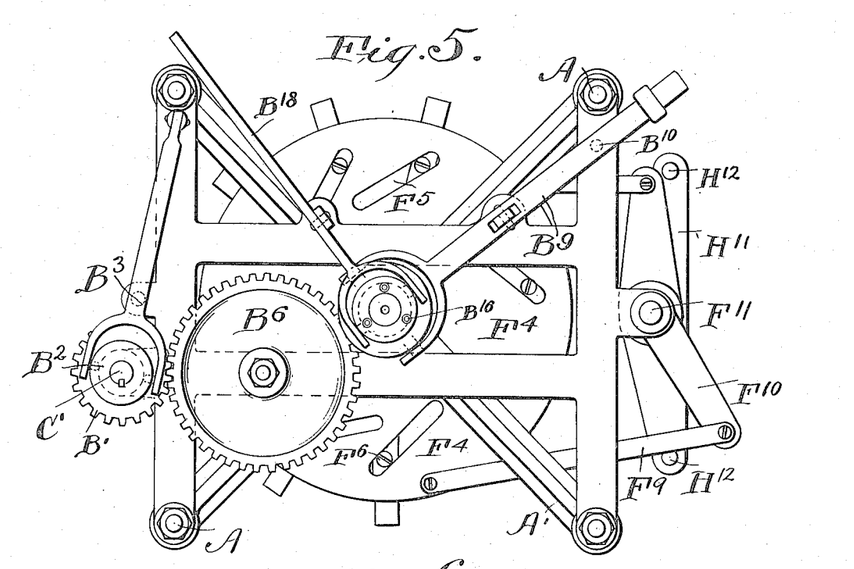
Fig. 5 is a plan looking at the top of the machine.

Inside of the chuck sleeve B and rotatable therewith are the chuck members, which, as will be seen from Fig. 4, are loosely swinging wedge shaped fingers B¹⁴ hung at the lower end of a reciprocatable tube B¹⁵ normally held down into operative position—that is to say, in the position in which the chuck fingers are closed, by means of springs B¹⁶ at its upper end. These springs are preferably held in position by bolts passing through the head of the chuck tube and secured to the head of the chuck sleeve. I also preferably provide a feeding tube B¹⁷ for the glass rods supported in the chuck tube.

Reciprocation of the chuck fingers is obviously necessary for feeding in the rods, holding them during the operation, and releasing them after the buttons have been formed and the anchor wires inserted in the buttons. This reciprocation is produced through the medium of a yoke lever B¹⁸ pivoted to the frame, the end of the lever being operated through the medium of a chain which may be controlled by a foot pedal or automatically, at the option of the operator,—this being a matter which will depend very largely upon the skill of the person who is running the machine.

Supported by the lower cross head A² is a guiding sleeve A³ for the reciprocating thrust rod E, against which the lower end of the glass rods are pressed for the purpose of forming the buttons when the glass is properly fused. In the upper end of the guiding sleeve is a block A⁴ having an insert E' of suitable metal, perforated to allow both the glass rod and the thrust rod to pass therein. Against the under side of said block bears a compression spring E² which bears against a shoulder upon the thrust rod, tending to throw the latter down so that its lower end bears against the cam E³ which controls its reciprocation,—this cam being suitably shaped to permit the thrust rod to retreat before the advancing glass rod, for the purpose of forming a button intermediate its length, and adapted to subsequently return the thrust rod to its upper position, at which a button is formed on the glass rod at its lower end, as will appear more fully below.

Supported upon the lower cross head, and in the proper horizontal plane for the purpose, is the wire feeding mechanism by which the anchor wires F are pushed into the glass buttons while they are in a fused or partially fused condition,—suitable heating means, such as blow pipes G, being arranged to effect the fusion or softening in the plane of the wire feeding devices. This portion of the machine comprises a fixed plate F' having suitably mounted therein, in radiating channels, feeding chucks for the wires. These chucks are best illustrated in Figs. 4, 7, 8 and 9. They comprise long narrow bars F² having suitable channel ways therethrough for receiving the wire. A dog F³ pivoted at F* straddles each bar about its middle portion with a loose fit such that the dog is permitted to oscillate vertically to grip and release the wire lying in the feed channel.

A disk F⁴ capable of slight oscillatory motion covers the wire chucks, and has therein cam slots F⁵ through which pass the heads F⁶ of the oscillatable dogs. Obviously, the turning of this over-lying disk in the proper direction will press the dogs F³ forward and not only cause the forward movement of the bars to which the dogs are pivoted, but will cause the latter to grip down upon the wire and advance the same evenly with the chuck bars themselves. The movement of the slotted disk in the opposite direction will throw the dogs up from their gripping position, loosening the wire lying in the feed channel, and at the same time moving the chuck bars backward a proper distance for taking a fresh grip upon the wire, this return movement taking place before the wire inserted into the button has been cut off, as described below.

For the purpose of insuring that the wire shall not be moved back through frictional contact with its channel walls, a spring pressed brake $F^7$ is located in the slotted end of the chuck bars, and the wire is fed through said brake so that it may be held thereby during the backward movement of the bars. This brake is supported in any suitable manner by the stationary plate on which the chuck bars are mounted.

For the purpose of insuring that the dogs $F^3$ shall bite down on the wire hard enough to draw it forward when the forward motion is transmitted to the chuck bars through the medium of the dogs, I provide friction shoes $F^8$ for increasing the resistance of the bars to movement, these shoes lying in a circular channel in the fixed plate $F'$ and being pressed against the bars through the medium of coiled springs interposed between the same.

The rotation of the operating disk is effected by means of a link $F^9$ pivotally connected therewith at one end and similarly connected at the other to a rock arm $F^{10}$ projecting from the upper portion of a vertical shaft $F^{11}$ having at its lower end a cross bar $F^{12}$ with adjustable pins $F^{13}$ therein at its opposite ends, which lie in the path of operating arms $F^{14}$ projecting from a secondary horizontal shaft G. This secondary horizontal shaft G receives its motion through the medium of bevel gears $G'$ from the previously mentioned primary horizontal shaft D, and the gears are so proportioned as to give this second shaft two revolutions to one of the first mentioned shaft. The reason for giving this second shaft an increased number of revolutions is that it controls the operation of the wire feeding and cutting mechanism, the operation of which is duplicated upon the two buttons of a single spider. The projecting arms $F^{14}$ just mentioned, which oscillate the cross bar $F^{12}$, and the vertical shaft $F^{11}$, which controls the wire feeding mechanism, are located at diametrically opposite points upon their shaft. so that while one tends to turn the cross bar in one direction, the other will reverse the direction of oscillation after a movement of 180 degrees on the part of the secondary horizontal shaft G. This movement will be again referred to in the general description of the operation of the machine.

Below the wire feeding mechanism and guided upon the upper end of the previously mentioned guide sleeve $A^3$ are the wire cutters H, H'. After the wire has been pressed into the fused buttons, these cutters move up in proper position to cut off the desired length of it. During this cutting operation, the gas flame is cut off, so as not to injure the cutter. After the cutting operation, the cutters are lowered out of the heat zone so as to be preserved from injury. This reciprocation occurs twice during the formation of each spider, since there are two buttons and two sets of anchor wires formed.

The lower or inside cutting member H is provided with a series of removable knives K. This member fits the guiding sleeve closely and is supported by means of a vertical rod $H^2$ connected in the present construction to a pivoted arm $H^4$ resting upon a double cam $H^3$ on the main horizontal shaft D,—this cam being shaped to give the double reciprocation referred to. The upper end of the supporting rod is shouldered and receives the load from a horizontal projecting plate $H^5$ secured to the lower end of the interior cutter. This plate is slotted, and the reduced end of the supporting rod projects through the slot, the slot being provided for the purpose of permitting the slight rotation of the cutter sufficient to perform the cutting operation.

Figure 2:
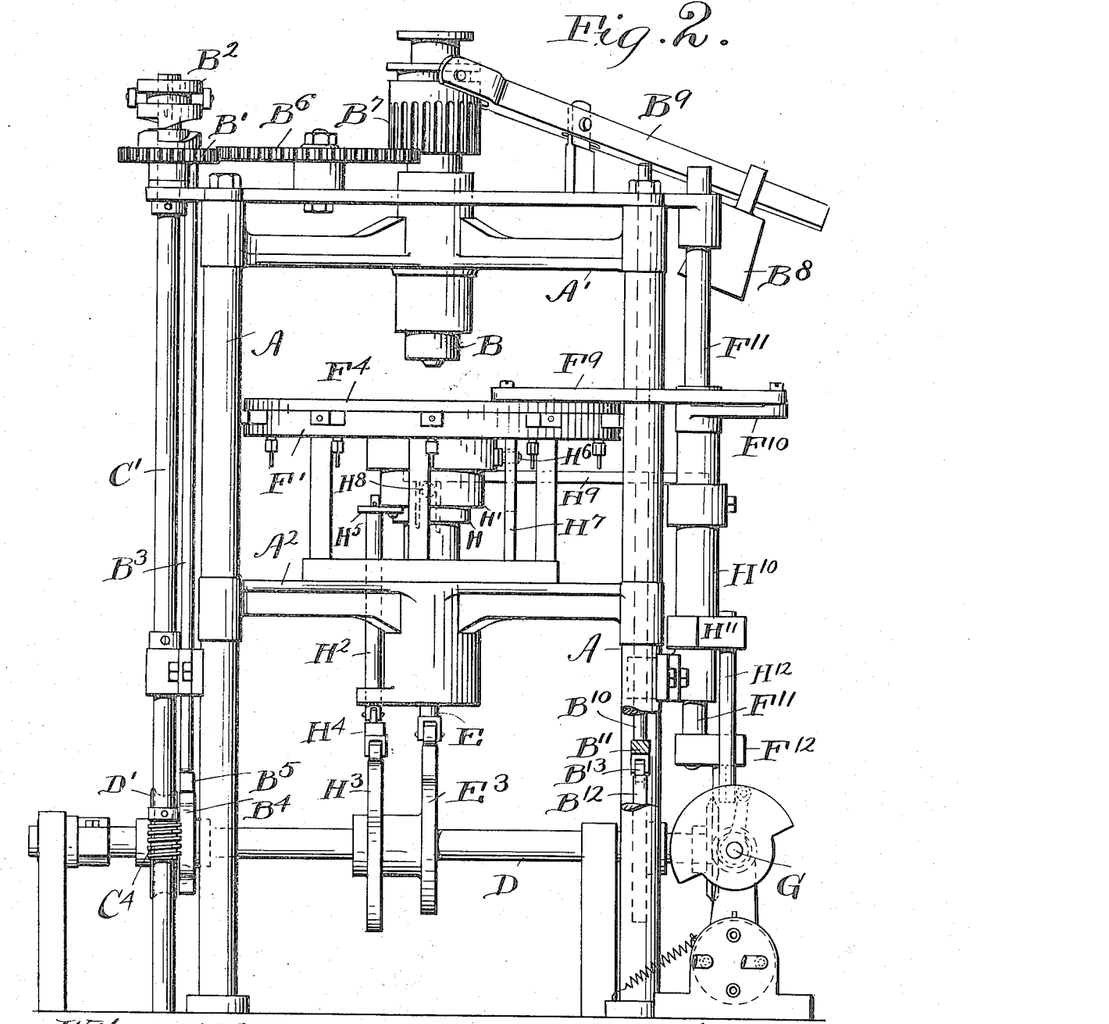
Fig. 2 is a similar view taken at ninety degrees from the view in Fig. 1.
Figure 3:
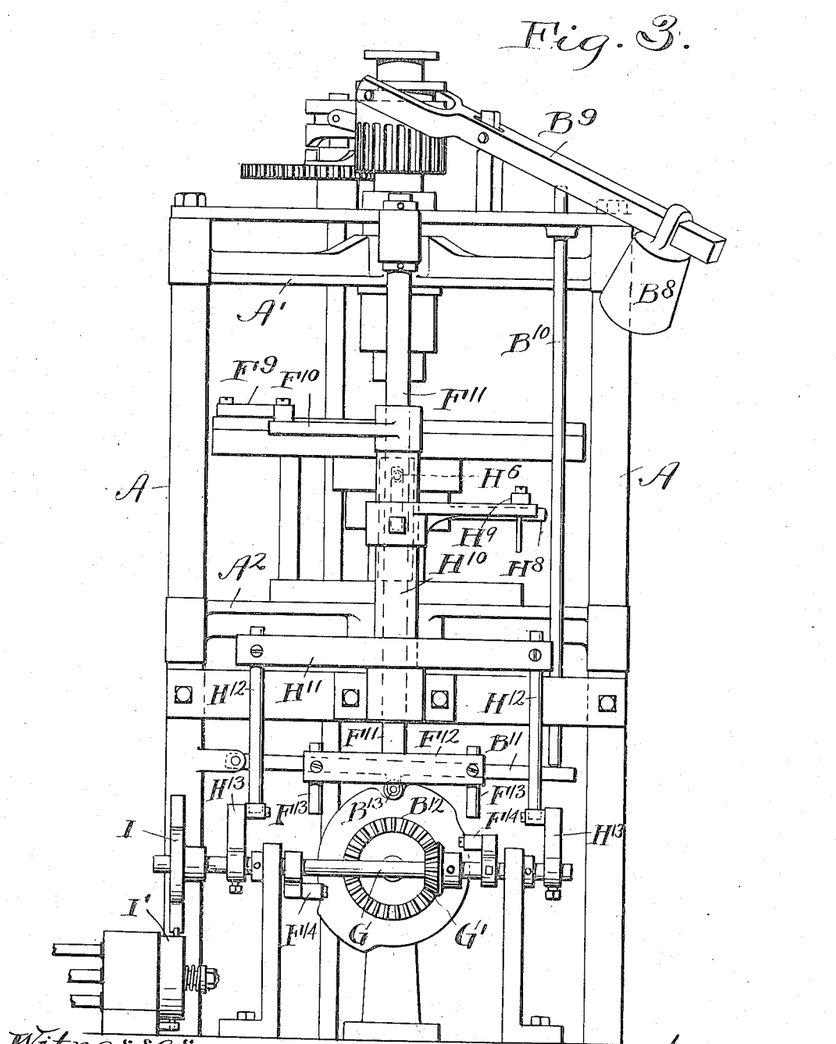
Fig. 3 is a view taken at ninety degrees from the view in Fig. 2 and opposite to the side shown in Fig. 1.

The upper and outer cutting member H' is provided with a series of spaced cutting members $K'$, the edges of which co-act with the knives K of member H. The member H' is supported by the lower and inner member, but is held against rotation by means of a pin $H^6$ projecting therefrom into a vertical slot in a fixed member $H^7$ of the frame, as seen in Figs. 2 and 3. Rotation of the inner cutter member is secured at the proper time through the medium of a rigid arm $H^8$ secured thereto and straddled at its outer end by depending legs from a link $H^9$ pivotally secured to a rock arm projecting from an oscillatable sleeve $H^{10}$ having fixed to its lower end an oscillatable cross bar $H^{11}$. From opposite ends of this cross bar depend adjustable legs $H^{12}$ lying in the path of rotation of short arms $H^{13}$ projecting from the secondary horizontal shaft G previously mentioned as receiving two revolutions to one of the main horizontal shaft. The arms $H^{13}$ projecting from this secondary shaft, which operate the oscillating cutter member, are properly disposed at different angles on the secondary shaft so as to throw the inner cutter member around to cut the wires at the proper time, and to then immediately afterward throw the cutter member back so as to leave an open space to receive the wire for its next operation. Obviously the operating arms on this secondary shaft may be adjusted for the proper timing of these movements or changing the time, should any changes be desired.

At the outer end of the secondary horizontal shaft G I have provided a suitably timed cam I for operating an economizing valve I' for controlling the heating medium, which shall not only economize in the matter of heat but shall shut the same off with a view to saving the cutting members when they are elevated to operating position within the best zone.

In operation the short lengths of glass rods necessary for the formation of the spiders are dropped into the feeding tube, either by hand or from a hopper, as desired, the chuck being held up at this time to permit the lower rod to fall therethrough upon the thrust rod E, the cam $E^3$ holding the latter at a properly spaced distance. Upon the release of the chuck tube, the springs controlling the same thrust it downward so that the wedge fingers hanging at the lower end thereof grasp the glass rod and hold it firmly. At this point the stop pin $D^3$, which has heretofore held the clutch member $C^2$ down away from the driving pulley C, as shown in Fig. 1, is slipped out of engagement with the vertical rod, which has held the yoke lever downward against the tension of its spring, thus permitting the spring to draw the yoke and the clutch member up into engagement with the driving pulley. Motion is thus transmitted to the vertical shaft C' and through the worm thereon to the main horizontal shaft, on which is fixed the cam $B^4$ that controls the clutch $B^2$ at the top of the shaft. This cam is properly timed to now permit the upper clutch to drop into engagement with the spur gear at the end of the shaft and transmit rotary movement to the chuck sleeve. At this point the vertical rod $B^{10}$ controlling the reciprocation of the chuck sleeve is lifted by its cam $B^{12}$ which, as before described, is also fixed to the main horizontal shaft, so that the glass rod held by the chuck is lowered with a rapid rotation into the heating zone,—the heat being at this point turned on by the controlling cam I on the secondary horizontal shaft. As the glass rod is thus lowered by its chuck the cam $E^3$ on the main horizontal shaft controlling the thrust rod permits the latter to drop to a certain distance and there holds it to receive the further downward pressure of the chuck, the heat at this time being sufficient to fuse the rod in the plane of the heat zone. At this point the cam $B^4$ controlling the clutch $B^2$ at the upper end of the vertical operating shaft throws the clutch out of engagement with the spur gear and stopping the rotation of the chuck which holds the glass rod. Obviously, the downward thrust of the chuck against the thrust rod will cause the glass rod to bulge outward and form a button at the fused portion, the button resting upon the insert in the head of the guiding sleeve. The slotted disk $F^4$ lying above the wire chuck bars now receives a rotation by reason of one of the projecting arms on the secondary horizontal shaft oscillating the cross bar at the lower end of the vertical rod, which is connected through a rock arm and a link with said slotted disk. The turning of this disk throws the wire chuck bars forward and thrusts the ends of the wire carried thereby into the fused glass button to a predetermined distance, this movement being a quick one, necessarily. The adjustments are, of course, so made that the wire ends do not enter the button to such a distance as to contact with each other, it being essential that there be no contact whatever between them. The economizing cam now shuts off the heat, and the slotted disk is given a reverse turn by the second operating arm on the secondary shaft, which pushes the cross bar in the opposite direction to the turning movement first given it. This will throw a backward pressure against the heads $F^6$ of the oscillating dogs $F^3$ on the wire chucks, releasing the wire lying in the channels of the bar and moving the bars backward, the wire being held meanwhile against backward movement by the spring pressed brake shown in Fig. 8. The double cam $H^3$ on the main horizontal shaft which controls the vertical reciprocation of the wire cutters now elevates the lifting rod, and the open cutters pass up into such position that the wires projecting from the wire chucks into the glass button lie between the cutting knives. The lower and inner rotatable cutter is then given a short turning movement, through the connections previously described, from a projecting arm on the secondary horizontal shaft, and the wires are cut at their proper length. The double cam referred to then immediately permits the drop of the cutting members, and the rotatable member is moved back to its open position by a second projecting arm on the secondary horizontal shaft, as previously described. The cam $B^{12}$ on the main horizontal shaft, which controls the vertical movement of the rotatable chuck holding the glass rod, now permits the latter to be raised by its counterweight to a suitable distance for the formation of the second and lower button on the spider,—the chuck being now again rotated by reason of the clutch $B^2$ on the vertical operating shaft C' having been dropped into engagement with the spur gear. Simultaneously with this upward movement of the rotatable chuck B, the thrust rod is lifted to the proper point to receive the end of the glass rod when the downward thrust of the chuck B shall again take place. It will be remembered that the thrust rod was previously lowered prior to the formation of the intermediate button, and it will be apparent that its elevation is necessary on account of the fact that the new button is formed at the end of the glass rod. The glass rod being now rotated in the heating zone and fused at a second point, the rotation of the chuck is again stopped and it is thrust downward slightly to press the glass rod against the thrust rod and produce a second button. A projecting arm on the secondary horizontal shaft G again transmits motion to the slotted disk controlling the wire chucks, causing them to move inward, thrust wires into the fused button, release the wires, and withdraw to their outward position. The wire cutting operation previously described is then repeated in precisely the same manner, the only difference being that the second member of the double cam H³ on the main operating shaft is utilized to elevate the cutters during the second cutting action,—the heat being meanwhile cut off from the heating zone. The spider is now completed and ready for removal from the machine, and at this point the stop pin D³ previously described as being located upon the outer end of the main horizontal shafts strikes against the short vertical rod lying in its path and throws the clutch on the vertical operating shaft out of engagement with the driving pulley, leaving the parts at rest while the completed spider is removed and the chuck fingers are opened for the reception of the next glass rod.

By the expression "rod" used in this specification, I refer not simply to solid rods, but include, of course, hollow rods commonly called tubes.

Having thus described my invention, I claim:

1. A machine of the class described comprising means for forming a fused zone upon a rod, and means for pushing wires endwise and transversely of said rod into the softened material of said zone.

2. A machine of the class described comprising means for sustaining a rod and for forming a button thereon, means for inserting wire endwise into said button transversely of the said rod and means for cutting the wire.

3. A machine comprising means for sustaining a rod, means for heating a portion thereof to soften it and means for inserting a plurality of wires radially into said softened portion at predetermined angular distances around the said rod.

4. The combination with means for sustaining a rod having a fused zone of means for inserting wire endwise into said zone and transversely thereof, and means for cutting off the wire to leave a portion projecting from said zone.

5. A machine comprising means for sustaining a rod having formed thereon a fused button, means for inserting wire endwise into said button and transversely thereof, and means for producing relative movement of the rod and the wire-inserting means to bring the desired portions of said rod into operative position for said wire inserting means.

6. A machine of the class described comprising means for forming a plurality of buttons permanently upon a rod, means for inserting wire in said buttons, and means for obtaining relative longitudinal movement between the rod and the wire inserting means.

7. A machine of the class described comprising means for forming a permanent button upon a rod and means for inserting a plurality of wires into said button with predetermined spacing.

8. A machine of the class described comprising means for sustaining a rod with a button thereon, means for inserting wire endwise into said button and transversely thereof, means for cutting said wire, said cutting means and the means for sustaining the rod being relatively reciprocable.

9. A machine of the class described comprising means for sustaining a rod, means for locally fusing the same and means for inserting wire endwise into the fused portion and transversely thereof.

10. A machine of the class described comprising means for fusing a portion of a glass rod, means for sustaining the rod in position such that the fused portion will not become detached therefrom, and means for inserting wire endwise and transversely of said rod into the fused portion.

11. A machine of the class described comprising means for locally fusing a body, means for inserting wire endwise into the fused portion, and means for releasing the wire after such insertion and withdrawing said inserting means without withdrawal of the wire from the body.

12. A machine of the class described comprising means for thrusting wire endwise into a fused portion of a rod and means for releasing the wire after such insertion and withdrawing said thrusting means without withdrawing the said wire from the rod.

13. A machine of the class described comprising means for locally heating and softening a rod, means for thrusting a plurality of wires radially into the fused portion of the rod so that the ends of said wires will be embedded in said rod and firmly held thereby upon the hardening of said fused portion.

14. A machine of the class described comprising means for supporting a glass rod, means for fusing a portion of said rod, means for applying pressure to said rod to form a button from said fused portion and means coacting with the aforesaid parts for feeding a plurality of wires radially into position so that their ends will be embedded in the said button.

15. A machine of the class described comprising means for supporting a glass rod, means for fusing a portion of said rod, means for applying pressure to said rod to form a button from said fused portion, means coacting with the aforesaid parts for feeding a plurality of wires radially into position so that their ends will be embedded in the said button, and means for cutting off a portion of each of said wires.

16. A machine of the class described comprising means for supporting a glass rod, means for fusing a portion of said rod, means for applying pressure to said rod to form a button from said fused portion, and means coacting with the aforesaid parts for simultaneously feeding a plurality of wires radially into position so that their ends will be embedded in the said button.

17. A machine of the class described comprising means for supporting a glass rod, means for fusing a portion of said rod, means for applying pressure to said rod to form a button from said fused portion, means coacting with the aforesaid parts for simultaneously feeding a plurality of wires radially into position so that their ends will be embedded in the said button, and means for simultaneously cutting off a portion of each of said wires.

18. A machine of the class described comprising means for holding a glass rod, means for directing a fusing flame against a portion of said rod, means for subsequently forming a button from said fused portion and for inserting wires into the same, means for repeating the aforestated operations upon another portion of said rod, and connections whereby all of the aforesaid means are brought into and out of operation in a predetermined order.

In testimony whereof, I hereunto affix my signature in the presnce of two witnesses.

JOHN T. FAGAN.

Witnesses:
H. R. SULLIVAN,
E. B. GILCHRIST.